United States Patent [19]

Johnson

[11] 4,337,622
[45] Jul. 6, 1982

[54] ENERGY STORAGE

[76] Inventor: Wilfred V. Johnson, 36 Rocky Hill Rd., Oxford, Mass. 01540

[21] Appl. No.: 148,758

[22] Filed: May 12, 1980

[51] Int. Cl.³ .............................................. F03G 7/06
[52] U.S. Cl. .................................. 60/641.13; 60/527; 74/2; 74/128; 185/40 R
[58] Field of Search ................ 60/530, 531, 527–529, 60/641.8, 641.9, 641.11, 641.12, 641.13, 641.14, 641.15; 185/40 R

[56]         References Cited
         U.S. PATENT DOCUMENTS

| Re. 25,242 | 9/1962  | Toulmin, Jr. . |           |
|------------|---------|---------------|-----------|
| 1,260,300  | 3/1918  | Bangerter     | 60/527    |
| 1,393,376  | 10/1921 | Irish         | 60/527    |
| 3,070,643  | 12/1962 | Toulmin, Jr. .|           |
| 3,339,077  | 8/1967  | Shapiro       | 60/529 X  |
| 3,383,246  | 5/1968  | Ferreira .    |           |
| 3,678,685  | 7/1972  | Low et al.    | 60/529    |
| 3,977,909  | 8/1976  | Cremonese .   |           |
| 3,986,354  | 10/1976 | Erb           | 60/528 X  |
| 4,173,123  | 11/1979 | Gurtler       | 60/641.8  |
| 4,174,979  | 11/1979 | Candor .      |           |

Primary Examiner—Allen M. Ostrager
Attorney, Agent, or Firm—Blodgett & Blodgett

[57]              ABSTRACT

Apparatus for storing solar energy, including a thermal-expansion motor operating through a ratchet mechanism to compress a coil spring located in an energy cell.

11 Claims, 3 Drawing Figures

ENERGY STORAGE

BACKGROUND OF THE INVENTION

For the past several thousands of years, mankind has developed many methods of storing the energy of the sun. These storage methods have generally taken the form of thermal energy (stored in high heat capacity storage means, such as bodies of water) or electrical energy (stored in electric batteries or the like). Storage of heat is an excellent way of storing solar energy if the ultimate use involves the slow release of energy, as in the heating of buildings. Electric batteries are adequate for use when large forces are not necessary or where electric energy is used directly, as in radios or the like. There is, however, a need for solar energy storage for use where large forces are necessary or large amounts of work need to be expended in a very short time span. Attempts to obtain this sort of storage in conversion in the past have been less than successful. This failure has largely been due to the fact that the equipment involved was expensive and complicated and easily rendered inoperative. These and other difficulties experienced with the prior art devices have been obviated in a novel manner by the present invention.

It is, therefore, an outstanding object of the invention to provide an apparatus for storing solar energy in which large amounts of energy are available for release in a very short period of time.

Another object of this invention is the provision of a solar energy apparatus in which energy is stored at a slow rate, but may be released at a rapid rate with high force available.

A further object of the present invention is the provision of an apparatus for converting solar energy to mechanical energy with high efficiency.

It is another object of the instant invention to provide a solar storage and release apparatus which is simple in construction, which is inexpensive to manufacture, and which is capable of a long life of useful service with a minimum of maintenance.

A still further object of the invention is the provision of a solar storage apparatus in which the stored energy is immediately available at a high work rate.

With these and other objects in view, as will be apparent to those skilled in the art, the invention resides in the combination of parts set forth in the specification and covered by the claims appended hereto.

SUMMARY OF THE INVENTION

In general, the invention consists of apparatus for the storage and release of solar energy. An optical device is provided for concentrating the sun's rays to a restricted area. A motor is located at the area, which motor has an element which is movable in response to changes in temperature. The element operates through a ratchet mechanism to act on a cell to store the energy produced by the element.

More specifically, a shutter is provided to interrupt the sun's rays on occasion to allow the motor temperature to drop and cause the element to retract. The shutter operates cyclicly to produce reciprocation of the movable element of the motor. The motor consists of a housing containing a body of expansible material. The storage cell consists of a housing containing a spring which is compressed by the movable element of the motor through a ratchet-and-pawl mechanism, the pawl being movable to release the energy in the spring on occasion.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
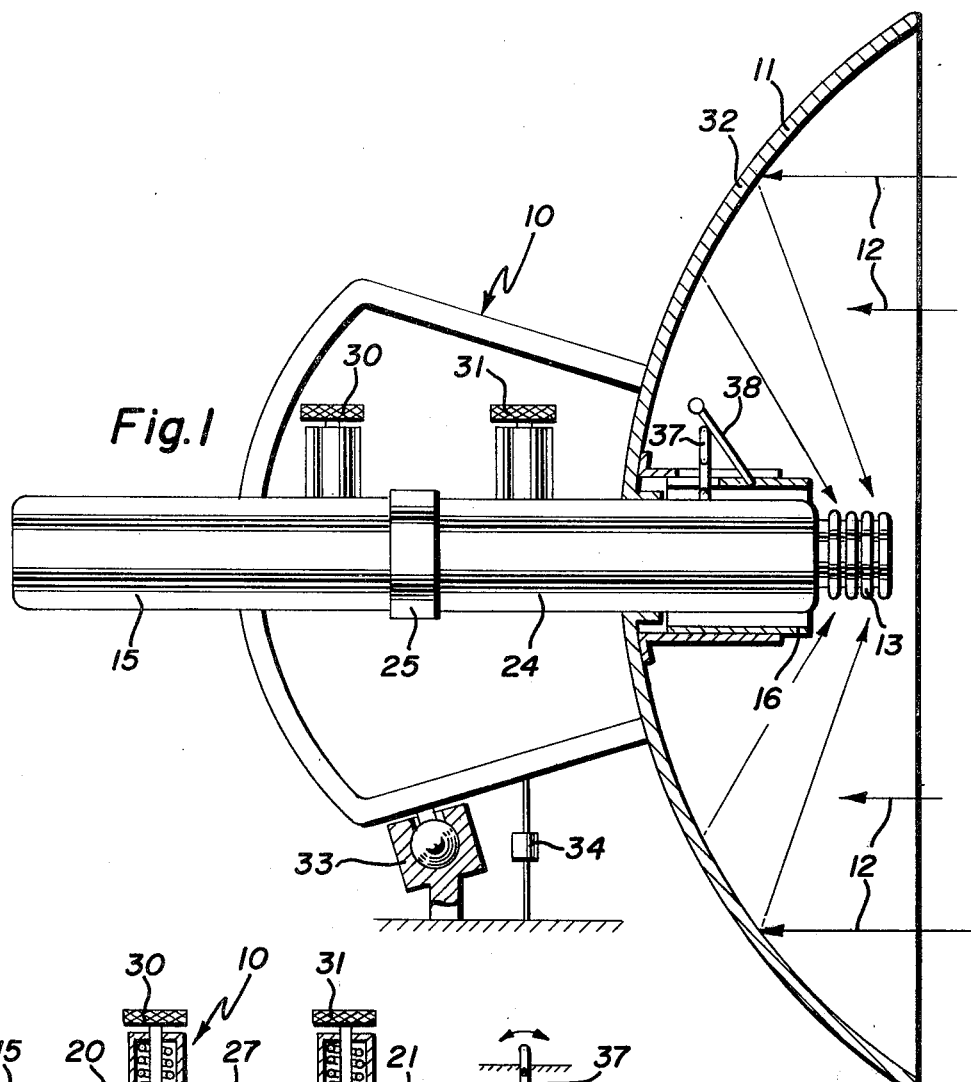
FIG. 1 is a front elevational view of a solar energy apparatus incorporating the principles of the present invention.

Referring first to FIG. 1, wherein are best shown the general features of the invention, the apparatus, indicated generally by the reference numeral 10, is shown in use for the storage of solar energy. The apparatus is provided with an optical device 11 for concentrating the rays 12 of the sun to a restricted area. Located at the restricted area is a motor 13, having an element 14 which is movable in response to changes in temperature. More specifically, the motor contains a body of material of a waxy nature which has an extremely high co-efficient of thermal expansion. An energy cell 15 is contacted by the said movable element for storing the energy produced by the motor.

A shutter 16 is provided to interrupt the sun's rays on occasion to allow the motor temperature to drop and to cause the movable element 14 to retract. The shutter operates cyclicly to produce reciprocation of the movable element of the motor.

Figure 2:
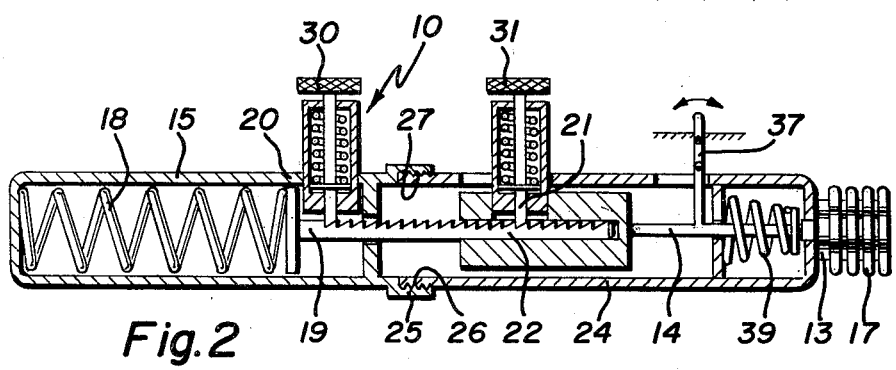
FIG. 2 is a vertical sectional view of a portion of the apparatus.

Referring to FIG. 2, which shows the internal construction of the motor and cell, the motor 13 consists of a housing 17 containing a body of expansible material that operates on the movable element 14. The expansible material has a high rate of thermal-expansion and contraction to produce a fast cycle of movement of the element. The cell 15 contains a coil spring 18 engaged by a one-way mechanism 19 which is in turn engaged by the movable element 14. The one-way mechanism 19 consists of a locking pawl 20 and a cycling pawl 21 operating on a ratchet 22.

Figure 3:
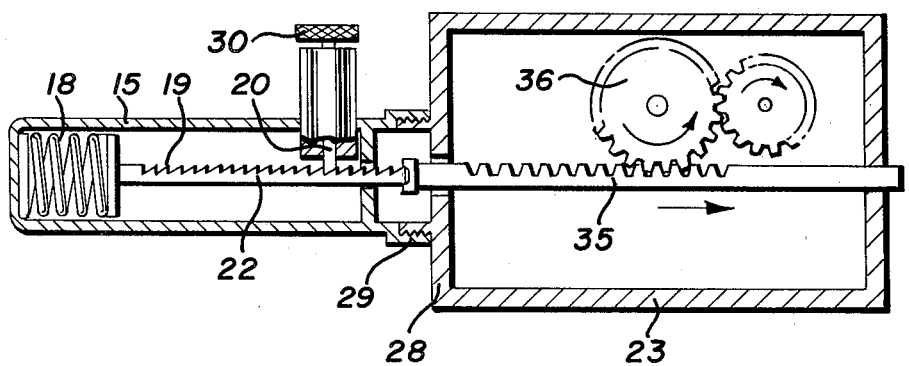
FIG. 3 is a vertical sectional view of an energy cell portion of the invention in use with a device making use of the stored energy.

As is best shown in FIG. 3, the energy cell 15 is removable from the motor 13 and can be attached to a useful device 23 in order to provide the said device with mechanical energy.

The motor 13 and the cell 15 have their housing joined by inter-engaging surfaces to lock them together. More specifically, the motor 13 has a housing extension 24 provided with external threads 26 which engage similar internal threads 25 in the housing 25 of the energy cell. Similarly, the useful device 23 is provided with a housing 28 having external threads 29 which are selected to threadedly engage and lock with the threads 25 of the cell housing. A button 30 is provided on the cell for selectively releasing the pawl 20 from the ratchet 22 on occasion for the transmittal of the mechanical energy stored in the spring 18 of the cell to the useful device. Specifically, the useful device 23 is provided with a reciprocable rack 35 operating through a gear train 36.

The optical device 11 consists of a parabolic mirror 32 mounted on a universal support 33 which serves to maintain the parabolic mirror directed toward the sun by adjustments made by a motor 34. As is evident in FIGS. 1 and 2, the portion of the motor 13 which is in the area on which the sun's rays are concentrated is mounted cantilever fashion along the axis of the mirror. The shutter 16 is in the form of a tube which is carried axially of the motor and slidable axially thereof. The shutter is moved from a first position where it is coaxial with the motor in the said area to an open position where it is not co-extensive with the motor in that area. The movable element 14 of the motor 13 is provided with a laterally-extending pivoted finger 37 which engages and actuates a lever 38 attached to the shutter, so that the shutter reciprocates with the movable element. As the movable element reciprocates, it compresses the spring more and more incrementally, because the cycling pawl allows the ratchet 22 to remain at its extreme position after each thrust movement of the motor. The spring 39, of course, causes the movable element 14 to return as the motor cools.

The method of operation and the advantages of the present invention will now be readily understood in view of the above description. With the cell 15 fastened to the motor 13, as shown in FIG. 1, the motor 34 operates to rotate the support 33 and the mirror 32 in such a way as to maintain the mirror directed toward the rays 12 of the sun. The parabolic surface of the mirror 32 directs the sun's rays toward its focus at which is located the motor 13. The shutter 16 is in retracted position, as shown in FIG. 1, so that the outer portion of the motor is exposed to the concentrated sun rays, thus heating it to a high temperature. As the motor is heated, the expansible material expands also and presses the movable element 14 to the left. This, in turn, pushes on the ratchet 22 which also moves to the left, thus compressing the coil spring 18. In the process the pawl 21 moves up the inclined surfaces of the teeth in the ratchet and drops into the following valleys, thus locking the spring 18 in its compressed condition. As the movable element 14 moves to the left, it operates on the pivoted lever 37, so that its upper end moves to the right, engages the lever 38, and causes the shutter 16 to move to the right until it eventually covers the motor and prevents the sun's rays from striking it. When this happens, its temperature goes down and the expansible material shrinks, so that the movable element 14 moves to the right. The expansible material is selected to have a high rate of cooling and a high rate of expansion and contraction, so that the cycle of heating and cooling takes place at a fairly rapid rate. This causes reciprocation of the movable element 14 and causes a successive moving of the ratchet 22 until the spring 18 is completely compressed. If the cell 15 is then removed from the motor (by unthreading the housing 25 from the housing extension 24 of the motor), the cell can then be carried to a remote location and threadedly mounted on the housing 28 of the useful device 23. If the button 31 is then lifted, the pawl 21 is released from the teeth of the ratchet 22 and the spring 18 moves the ratchet 22 to the right, thus pushing the rack 35 to the right also and actuating the gear train 36. The nature of the useful device 23 will determine the rate at which energy is released from the spring 18. In some instances, the energy will be released rather quickly with high force. At other times the construction of the useful device will determine that the energy will be released slowly and over a long period of time.

It can be seen, then, that the present invention, by use of relatively simple apparatus, provides for the storage of solar energy in a purely mechanical form and also provides for the availability of that energy in high-force form, if necessary, this is in contrast to those forms in which only electrical energy is available when the storage form is that of a electrical battery.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for storing solar energy comprising:
   (a) an optical device for concentrating the sun's rays, to a restricted area,
   (b) a motor located at the area and having an element movable in response to changes in temperature,
   (c) a cell contacted by the said movable element for storing the energy produced by the element,
   (d) a shutter for interrupting the sun's rays to the motor on occasion to allow the motor temperature to drop and cause the element to retract, said shutter being in the form of a tube that is guided for axial movement from a closed position where it is co-extensive and envelops with said motor to an open position in which it is non-coextensive with said motor.

2. Apparatus as recited in claim 1, wherein the movable element of the motor is provided with a laterally-extending finger which engages a lever attached to the shutter, so that the shutter reciprocates with the movable element.

3. Apparatus as recited in claim 1, wherein the shutter operates cylically to produce reciprocation of the movable element of the motor.

4. Apparatus as recited in claim 1, wherein the motor consists of a housing containing a body of expansible material that operates on the movable element, the expansible material having a high rate of expansion and contraction to produce a fast cycle of movement of the element.

5. Apparatus as recited in claim 1, wherein the cell contains a coil spring engaged by a one-way mechanism which is in turn engaged by the movable element of the motor.

6. Apparatus as recited in claim 5, wherein the one-way mechanism consists of a spring-loaded pawl and a ratchet.

7. Apparatus as recited in claim 1, wherein the cell is removable from the motor, and attachable to a useful device for providing the said device with mechanical energy.

8. Apparatus as recited in claim 5, wherein the motor and the cell have housing that have interengaging surfaces to lock them together, wherein the useful device has a housing with surfaces to permit it to be locked to the cell, and wherein a button is provided to permit the pawl to be selectively released for transmittal of the mechanical energy from the cell to the useful device.

9. Apparatus as recited in claim 6, wherein the useful device has a rack reciprocably mounted in the housing and engaging a gear train.

10. Apparatus as recited in claim 1, wherein the optical device consists of a parabolic mirror mounted on a universal support and caused to follow the sun by a motor.

11. Apparatus as recited in claim 1, wherein the movable element of the motor reciprocates to load the cell in increments, the element operating through a ratchet-and-pawl mechanism, including a locking pawl and a separate cycling pawl.

* * * * *